(12) United States Patent
Fujikawa et al.

(10) Patent No.: US 7,811,696 B2
(45) Date of Patent: Oct. 12, 2010

(54) LITHIUM SECONDARY BATTERY AND METHOD FOR PRODUCING THE SAME

(75) Inventors: Masato Fujikawa, Moriguchi (JP); Akira Nagasaki, Neyagawa (JP); Tetsu Hashimoto, Moriguchi (JP); Kaoru Inoue, Hirakata (JP); Mikinari Shimada, Yawata (JP)

(73) Assignee: Panasonic Corporation, Osaka (JP)

( * ) Notice: Subject to any disclaimer, the term of this patent is extended or adjusted under 35 U.S.C. 154(b) by 982 days.

(21) Appl. No.: 11/330,183

(22) Filed: Jan. 12, 2006

(65) Prior Publication Data

US 2006/0154139 A1    Jul. 13, 2006

(30) Foreign Application Priority Data

Jan. 12, 2005    (JP) .............................. 2005-004784

(51) Int. Cl.
*H01M 4/00* (2006.01)
*H01M 6/10* (2006.01)
*H01M 2/02* (2006.01)
*H01M 6/08* (2006.01)

(52) U.S. Cl. ........................................ 429/94; 429/164
(58) Field of Classification Search .................. 429/94, 429/137, 233, 247, 255
See application file for complete search history.

(56) References Cited

U.S. PATENT DOCUMENTS 6,325,611 B1 * 12/2001 Iwasaki et al. .............. 425/164

6,387,564 B1 * 5/2002 Yamashita et al. .......... 429/132
2004/0202928 A1 * 10/2004 Miyamoto et al. .......... 429/137

FOREIGN PATENT DOCUMENTS

| JP | 07-220759 | | 8/1995 |
| JP | 07220759 A | * | 8/1995 |
| JP | 10-106530 A | | 4/1998 |
| JP | 2004-063343 | | 2/2004 |
| JP | 2004063343 A | * | 2/2004 |
| JP | 2004-247064 A | | 9/2004 |

OTHER PUBLICATIONS

Chinese Office Action issued in Chinese Patent Application No. CN 2006100048167, mailed Aug. 31, 2007.

* cited by examiner

*Primary Examiner*—Dah-Wei D Yuan
*Assistant Examiner*—Jacob Marks
(74) *Attorney, Agent, or Firm*—McDermott Will & Emery LLP (57) ABSTRACT

In a lithium secondary battery of the present invention, the positive electrode includes a positive electrode current collector and a positive electrode active material layer carried on the positive electrode current collector, the negative electrode includes a negative electrode current collector and a negative electrode active material layer carried on the negative electrode current collector, a heat-resistant layer is formed on the negative electrode, and an insulating tape is attached onto at least a part of the exposed portion of the positive electrode current collector that is opposite to the end of the negative electrode active material layer. Thus, by forming the heat-resistant layer on the negative electrode and attaching the insulating tape onto a part of the exposed portion of the positive electrode current collector, it is possible to efficiently provide a lithium secondary battery exhibiting high safety.

11 Claims, 7 Drawing Sheets

LITHIUM SECONDARY BATTERY AND METHOD FOR PRODUCING THE SAME

FIELD OF THE INVENTION

The present invention relates to a lithium secondary battery that realizes both improved safety such as high short circuit resistance and heat resistance, and high capacity, while providing excellent productivity, and to a method for producing the lithium secondary battery.

BACKGROUND OF THE INVENTION

Between the positive electrode and the negative electrode of a chemical battery such as a lithium secondary battery, a separator is disposed, which serves to provide an electrical insulation between the electrodes, and to retain the electrolyte. For lithium secondary batteries, separators comprising a polyolefin resin such as polyethylene or polypropylene are mainly used at present. In general, the positive electrode and the negative electrode are each formed by a current collector and an active material layer carried on the current collector.

However, such separators comprising a polyolefin resin tend to contract when exposed to a high temperature environment, so that there is the possibility that the positive electrode and the negative electrode come into physical contact with each other, causing internal short circuit. Particularly, when internal short circuit occurs between the positive and negative electrode current collectors, or between the positive electrode current collector and the negative electrode active material, a larger amount of short circuit current flows owing to a low resistance at the short circuit portion, resulting in a high possibility of causing temperature increase in the battery.

Furthermore, with the recent demand for high capacity lithium secondary batteries, there is a tendency to reduce the thickness of separators. Thus, the problem of internal short circuit is becoming increasingly important.

Therefore, in order to address the above-described problems and to improve the safety of the battery, there has been proposed a technique for preventing internal short circuit between the positive electrode current collector and the negative electrode current collector by attaching an insulating tape to an exposed portion of the positive or negative electrode current collector (see Japanese Laid-Open Patent Publication No. 2004-247064). There has also been proposed a technique for forming an ion-permeable, heat-resistant layer comprising ceramic particles and a binder on at least one of the positive electrode plate and the negative electrode plate, in order to prevent short circuit between the positive electrode and the negative electrode (see Japanese Laid-Open Patent Publication No. Hei 10-106530).

However, in order to prevent short circuit between the exposed portion of the positive electrode current collector and the negative electrode only by attaching the insulating tape, the exposed portion of the current collector must be completely covered with the insulating tape in the technique disclosed in Japanese Laid-Open Patent Publication No. 2004-247064. However, an extremely high precision is required for attaching the insulating tape so as to completely cover only the exposed portion of the positive electrode current collector. This leads to a reduced productivity. On the other hand, when the insulating tape is attached onto an area extending from the exposed portion of the positive electrode current collector to the positive electrode active material layer, the part of the positive electrode active material layer onto which the insulating tape is attached cannot contribute to the battery reaction. This will result in a decreased battery capacity.

When the heat-resistant layer is formed, for example, on the negative electrode with the technique disclosed in Japanese Laid-Open Patent Publication No. Hei 10-106530, it is necessary to reliably form the heat-resistant layer also on the boundary portion between the negative electrode active material layer and the exposed portion of the negative electrode current collector, in order to reliably prevent short circuit between the exposed portion of the positive electrode current collector and the negative electrode. However, since there is a height difference between the negative electrode active material layer and the exposed portion of the negative electrode current collector, it is necessary to decrease the speed of applying a paste for forming a heat-resistant layer, in order to reliably form the heat-resistant layer on their boundary portion. This leads to a reduced productivity.

In view of the foregoing problems, it is an object of the present invention to provide a lithium secondary battery that realizes both improved safety such as high short circuit resistance and heat resistance, and high battery capacity, while providing excellent productivity.

BRIEF SUMMARY OF THE INVENTION

The present invention provides a lithium secondary battery including an electrode group obtained by winding a positive electrode and a negative electrode, the positive electrode including a positive electrode current collector and a positive electrode active material layer carried on the positive electrode current collector, the negative electrode including a negative electrode current collector and a negative electrode active material layer carried on the negative electrode current collector, an exposed portion on which the positive electrode active material layer is not carried being provided on the positive electrode current collector at at least one of an initial winding end and a final winding end of the positive electrode, an exposed portion on which the negative electrode active material layer is not carried being provided on the negative electrode current collector at at least one of an initial winding end and a final winding end of the negative electrode, wherein a heat-resistant layer including a filler and a binder is formed on at least a part of the exposed portion of the negative electrode current collector and the entire surface of the negative electrode active material layer on the negative electrode, at least one of the initial winding end and the final winding end of the negative electrode active material layer is opposite to the exposed portion of the positive electrode current collector, and the positive electrode includes an insulating tape attached onto at least a part of the exposed portion of the positive electrode current collector that is opposite to the end of the negative electrode active material layer.

In another aspect, the present invention provides a lithium secondary battery including an electrode group obtained by winding a positive electrode, a negative electrode and a separator disposed between the positive electrode and the negative electrode, the positive electrode including a positive electrode current collector and a positive electrode active material layer carried on the positive electrode current collector, the negative electrode including a negative electrode current collector and a negative electrode active material layer carried on the negative electrode current collector, an exposed portion on which the positive electrode active material layer is not carried being provided on the positive electrode current collector at at least one of an initial winding end and a final winding end of the positive electrode, an exposed portion on which the negative electrode active material layer is not carried being provided on the negative electrode current collector at at least one of an initial winding end and a final winding end of the negative electrode, wherein a heat-resistant layer including a filler and a binder is formed on at least a part of the exposed portion of the negative electrode current collector and at least a part of a surface of the negative electrode active material layer that includes the end of the negative electrode active material layer, at least one of the initial winding end and the final winding end of the negative electrode active material layer is opposite to the exposed portion of the positive electrode current collector, and the positive electrode includes an insulating tape attached onto at least a part of the exposed portion of the positive electrode current collector that is opposite to the end of the negative electrode active material layer.

In a preferred embodiment of the present invention, the insulating tape is attached onto only the exposed portion of the positive electrode current collector.

Furthermore, the present invention relates to a method for producing a lithium secondary battery including an electrode group in which a positive electrode including a positive electrode current collector and a positive electrode active material layer carried on the positive electrode current collector, and a negative electrode including a negative electrode current collector and a negative electrode active material layer carried on the negative electrode current collector are wound. This method includes the steps of:

(A) producing a positive electrode in which an exposed portion is provided on the positive electrode current collector at at least one of an initial winding end and a final winding end of the positive electrode;

(B) producing a negative electrode in which an exposed portion is provided on the negative electrode current collector at at least one of an initial winding end and a final winding end of the negative electrode;

(C) mixing a filler, a binder and a dispersion medium to prepare a paste for forming a heat-resistant layer;

(D) applying the paste onto at least a part of the exposed portion of the negative electrode current collector, and the entire surface of the negative electrode active material layer, followed by drying, thereby forming a heat-resistant layer;

(E) attaching an insulating tape onto a part of the exposed portion of the positive electrode current collector that is opposite to the end of the negative electrode active material layer; and (F) winding the positive electrode on which the insulating tape has been attached, and the negative electrode on which the heat-resistant layer has been formed to obtain an electrode group.

Furthermore, the present invention relates to a method for producing a lithium secondary battery including an electrode group in which a positive electrode including a positive electrode current collector and a positive electrode active material layer carried on the positive electrode current collector, a negative electrode including a negative electrode current collector and a negative electrode active material layer carried on the negative electrode current collector, and a separator disposed between the positive electrode and the negative electrode are wound. This method includes the steps of:

(a) producing a positive electrode in which an exposed portion is provided on the positive electrode current collector at at least one of an initial winding end and a final winding end of the positive electrode;

(b) producing a negative electrode in which an exposed portion is provided on the negative electrode current collector at at least one of an initial winding end and a final winding end of the negative electrode;

(c) mixing a filler, a binder and a dispersion medium to prepare a paste for forming a heat-resistant layer;

(d) applying the paste onto at least a part of the exposed portion of the negative electrode current collector, and at least a part of a surface of the negative electrode active material layer that includes the end of the negative electrode active material layer, followed by drying, thereby forming a heat-resistant layer;

(e) attaching an insulating tape onto a part of the exposed portion of the positive electrode current collector that is opposite to the end of the negative electrode active material layer; and (f) winding the positive electrode including the insulating tape attached thereon, and the negative electrode including the heat-resistant layer formed thereon, with a separator interposed between the positive electrode and the negative electrode, to obtain an electrode group. In this production method of the present invention, it is preferable that the heat-resistant layer is formed on the entire surface of the negative electrode active material layer.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Hereinafter, embodiments of the present invention will be described with reference to the accompanying drawings.

Embodiment 1

Figure 1:
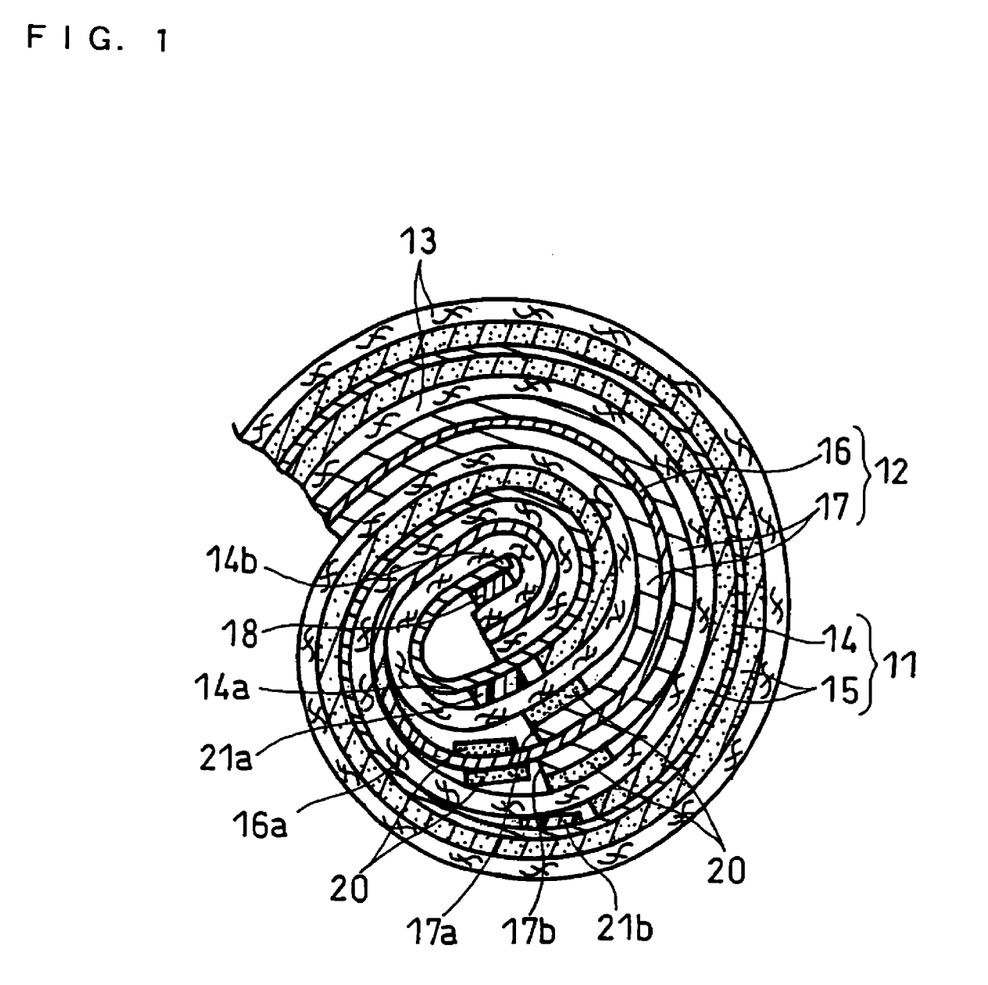
FIG. 1 is a cross-sectional view schematically showing an electrode group included in a lithium secondary battery according to one embodiment of the present invention on its central side.
Figure 2:
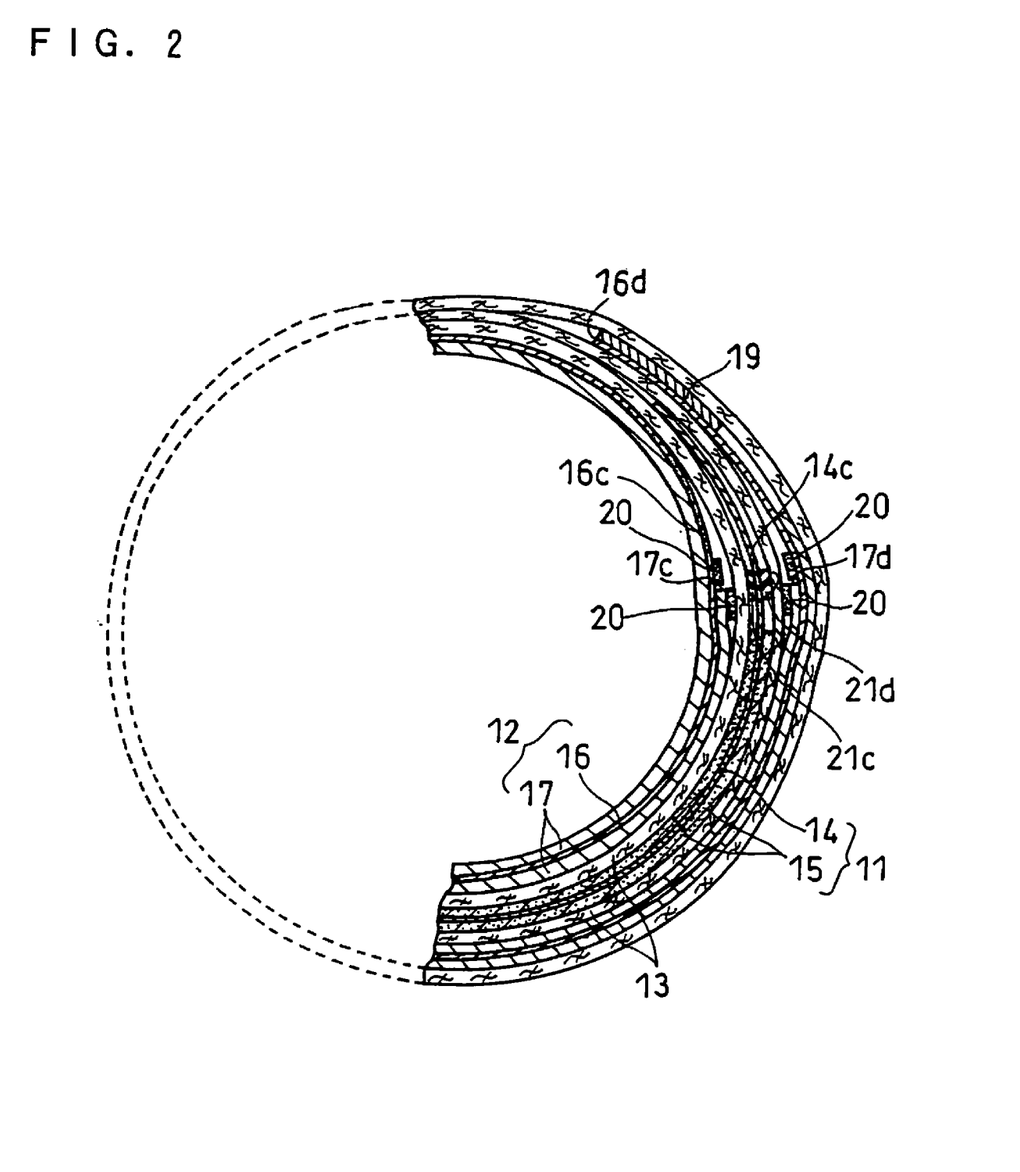
FIG. 2 is a cross-sectional view schematically showing an electrode group included in a lithium secondary battery according to one embodiment of the present invention on its outer circumferential side.

A lithium secondary battery of the present invention is provided with power generating elements and a battery case for housing the power generating elements. The power generating elements include an electrode group and an electrolyte. FIG. 1 and FIG. 2 show an example of the electrode group used for the lithium secondary battery of the present invention. FIG. 1 shows the electrode group on its central side, and FIG. 2 shows the electrode group on its outer circumferential side.

The electrode group shown in FIG. 1 and FIG. 2 includes a positive electrode 11, a negative electrode 12, and a separator 13 disposed between the positive electrode 11 and the negative electrode 12. In the electrode group, the positive electrode 11, the negative electrode 12 and the separator 13 are wound in a spiral form.

The positive electrode 11 includes a positive electrode current collector 14 and positive electrode active material layers 15 carried on both sides of the positive electrode current collector 14. The negative electrode 12 includes a negative electrode current collector 16 and negative electrode active material layers 17 carried on both sides of the negative electrode current collector 16.

As shown in FIG. 1, the positive electrode current collector is provided with an exposed portion 14a at the initial winding end of the positive electrode 11. The negative electrode current collector is provided with an exposed portion 16a at the initial winding end of the negative electrode 12. As shown in FIG. 2, the positive electrode current collector is provided with an exposed portion 14c at the final winding end of the positive electrode 11. The negative electrode current collector is provided with an exposed portion 16c at the final winding end of the negative electrode 12. In addition, a positive electrode lead 18 is bonded to an end 14b of the exposed portion 14a of the positive electrode current collector on the initial winding side, as shown in FIG. 1. Further, a negative electrode lead 19 is bonded to an end 16d of the exposed portion 16c of the negative electrode current collector on the final winding side, as shown in FIG. 2. Each of the positive electrode lead 18 and the negative electrode lead 19 extends in the axis direction of the electrode group. The positive electrode lead 18 extends upward from the electrode group, whereas the negative electrode lead 19 extends downward from the electrode group.

In general, the negative electrode active material layer is longer than the positive electrode active material layer in a lithium secondary battery, so that a part of the positive electrode that is opposite to the end of the negative electrode active material layer usually is an exposed portion of the positive electrode current collector, both on the central side and the outer circumferential side of the electrode group.

On the initial winding side of the negative electrode 12, the negative electrode active material layers 17 carried on both sides of the negative electrode current collector 16 begin at the same position on the negative electrode current collector 16. It should be noted that on the initial winding side of the positive electrode 11 shown in FIG. 1, the positive electrode active material layer is not formed on a part of the positive electrode that is not opposite to the negative electrode via the separator.

In the electrode group shown in FIG. 1, a porous heat-resistant layer 20 is formed on at least a part of the surface of the exposed portion 16a of the negative electrode current collector on each of the side facing the inner circumferential side and the side facing the outer circumferential side. Further, the heat-resistant layer 20 is also formed on a part of the surface of the negative electrode active material layer 17 carried on the side of the negative electrode current collector that faces the inner circumferential side, and a part of the surface of the negative electrode active material layer carried on the side of the current collector that faces the outer circumferential side. These parts include an end 17a and end 17b respectively.

In the case of forming the heat-resistant layer 20 on the negative electrode 12, for example, a paste including components constituting the heat-resistant layer 20 is applied onto the negative electrode 11. At this time, when the speed of applying the paste is increased to improve the productivity, the paste may not be applied onto a part of the exposed portion 16a of the negative electrode current collector that is in the vicinity of the end 17a of the negative electrode active material layer 17 (i.e. the boundary portion between the end of the negative electrode active material layer and the exposed portion of the negative electrode current collector), because there is a height difference, for example, between the end 17a of the negative electrode active material layer 17 and the exposed portion 16a of the negative electrode current collector. Therefore, as shown in FIG. 1, the heat-resistant layer 20 cannot be formed, for example, on a part of the exposed portion 16a of the negative electrode current collector that is in the vicinity of the end 17a of the negative electrode active material layer 17. Therefore, according to the present invention, the insulating tape is further attached onto a part of the exposed portion of the positive electrode current collector that is opposite to the end of the negative electrode active material layer.

In the electrode group shown in FIG. 1 and FIG. 2, the positive electrode, the negative electrode and the separator inserted between the electrodes are wound in a spiral form, with the positive electrode placed on the inner side. For example, on the central side of the electrode group, the initial winding end of the negative electrode active material layers 17 is sandwiched by the exposed portion of the positive electrode current collector, as shown in FIG. 1. An insulating tape 21a is attached onto a part of the exposed portion 14a of the positive electrode current collector that is opposite to the end 17a of the negative electrode active material layer on the inner circumferential side. Similarly, an insulating tape 21b is attached onto a part of the exposed portion 14a of the positive electrode current collector that is opposite to the end 17b of the negative electrode active material layer on the outer circumferential side.

At the outermost circumference portion of the electrode group, the exposed portion 14c of the positive electrode current collector is provided on the final winding end of the positive electrode as shown in FIG. 2. The exposed portion 14c of the positive electrode current collector is sandwiched by an end 17c of the negative electrode active material layer located on the inner circumferential side thereof, and an end 17d of the negative electrode active material layer located on the outer circumferential side thereof. An insulating tape 21c is attached onto a part of the exposed portion 14c of the positive electrode current collector that is opposite to the end 17c of the negative electrode active material layer. Similarly, an insulating tape 21d is attached onto a part of the exposed portion 14c of the positive electrode current collector that is opposite to the end 17d of the negative electrode active material layer.

Similarly, on the final winding side of the negative electrode 12, the heat-resistant layer 20 is formed on at least a part of the surface of the exposed portion 16c of the negative electrode current collector that faces the outer circumferential side, and a part of the surface of the negative electrode active material layer 17 that includes the end 17c. Further, the heat-resistant layer 20 is also formed on at least a part of the surface of the exposed portion 16a of the negative electrode current collector that faces the inner circumferential side, and a part of the surface of the negative electrode active material layer 17 that includes the end 17d. Here, as shown in FIG. 2, on the outer circumferential side of the electrode group, the negative electrode active material layer is not formed on a part of the negative electrode current collector that is not opposite to the positive electrode via the separator.

As described above, according to the present invention, the heat-resistant layer 20 is formed on the negative electrode 12, and the insulating tape 21 is attached onto a part of each of the exposed portions of the positive electrode current collector that is opposite to the corresponding end of the negative electrode active material layer. Therefore, unlike the conventional technology, it is not necessary to attach the insulating tape in such a large area that it covers the positive electrode active material layer, and to completely cover the exposed portion of the positive electrode current collector. Accordingly, the present invention can provide a lithium secondary battery whose heat resistance has been improved and in which short circuit between the positive electrode and the negative electrode has been efficiently prevented, while maintaining high productivity.

Furthermore, since it is not necessary to attach the insulating tape in such a large area that it covers the positive electrode active material layer, the thickness of the active material layer will not increase. This makes it possible to reduce the height difference caused by the ends of the active material layer, thus producing an electrode group with high roundness. Accordingly, the stress inside the electrode group can be reduced.

In this embodiment, the separator is disposed between the positive electrode and the negative electrode. Therefore, it is possible to sufficiently prevent short circuit, for example, between the positive electrode current collector and the negative electrode active material layer, by forming the heat-resistant layer on at least a part of the surface of the negative electrode active material layer that includes the end of the negative electrode active material layer, and at least a part of the exposed portion of the negative electrode current collector. Needless to say, the heat-resistant layer may be formed on the entire surface of the negative electrode active material layer. This makes it possible to improve the short circuit resistance even further.

It is preferable that the insulating tape is attached onto the exposed portion of the positive electrode current collector in a large area within a range that does not affect the productivity. Further, it is preferable that the insulating tape is attached such that its adhesive surface is in contact with the exposed portion of the positive electrode current collector. That is, it is preferable that the insulating tape is attached only to the exposed portion of the positive electrode current collector. Consequently, the electrode reaction at the positive electrode is not inhibited by the insulating tape, thus making it possible to prevent a decrease in the battery capacity.

In the electrode group shown in FIG. 1 and FIG. 2, each of the positive electrode and the negative electrode is provided with an exposed portion on the current collector at both the initial winding end and the final winding end thereof. At the positive electrode, the exposed portion of the current collector may be provided at one of the initial winding end and the final winding end of the positive electrode. Similarly, at the negative electrode, the exposed portion of the current collector may be provided at one of the initial winding end and the final winding end of the negative electrode. When the exposed portion of the current collector is provided at one of the ends of each of the positive electrode and the negative electrode in this way, the above-described effects can be achieved by attaching the insulating tape onto a part of the exposed portion of the positive electrode current collector that is opposite to the end of the negative electrode active material layer, and providing the heat-resistant layer on the exposed portion of the negative electrode current collector and the surface of the negative electrode active material layer.

Preferably, the insulating tape is stable inside the lithium secondary battery, both chemically and electrochemically. As the insulating tape, it is possible to use, for example, an insulating tape including a substrate and an adhesive applied onto the substrate. Examples of the material of the substrate used for the insulating tape include polypropylene, polyphenylene sulfide and an imide resin. As the adhesive, it is possible to use, for example, an adhesive containing acrylic rubber or butyl rubber.

It is particularly preferable to use a substrate comprising a material having heat resistance, such as an imide resin. By using such a substrate, it is possible to prevent not only short circuit between the positive electrode and the negative electrode, but also expansion of a short circuit portion when short circuit has occurred.

The porous heat-resistant layer formed on the negative electrode includes a filler and a binder. As the filler, it is possible to use, for example, an inorganic oxide and resin particles. In particular, it is preferable to use an inorganic oxide as the filler, since it has high heat resistance and excellent electrochemical stability. Examples of the inorganic oxide include alumina, silica, zirconia, titania and magnesia. Among them, alumina is particularly preferable, because it can be suitably transformed into coating. These fillers may be used alone or in combination of two or more of them. The porosity of the heat-resistant layer is preferably 30 to 70%.

Further, as the binder included in the heat-resistant layer, it is preferable to use a resin having high heat resistance. Examples of such a resin include resins containing acrylonitrile units.

In addition, the heat-resistant layer may be formed by a single layer or two ore more layers containing different fillers.

As described above, the positive electrode includes a positive electrode current collector and positive electrode active material layers carried on the positive electrode current collector. Each of the positive electrode active material layers includes a positive electrode active material, a binder and a conductive agent. As the positive electrode current collector, the positive electrode active material, the binder and the conductive agent, it is possible to use those commonly used in the art. As the positive electrode active material, it is possible to use, for example, a lithium-containing composite oxide such as lithium cobaltate and a modified product thereof, lithium nickelate and a modified product thereof, as well as lithium manganate and a modified product thereof. These may be used alone or in combination of two or more of them.

As the binder, it is possible to use, for example, polytetrafluoroethylene, polyvinylidene fluoride and modified products thereof. These may be used alone or in combination of two or more of them.

As the conductive agent, it is possible to use, for example, acetylene black, Ketjen Black and various graphites. These may be used alone or in combination of two or more of them.

As the positive electrode current collector, it is possible to use, for example, a metal foil comprising stainless steel, aluminum or titanium. The thickness of the positive electrode current collector is preferably, but not particularly limited to, 1 to 500 μm.

The negative electrode includes a negative electrode current collector and negative electrode active material layers carried on the negative electrode current collector. Each of the negative electrode active material layers includes a negative electrode active material, a binder, and, if necessary, a conductive agent. As the negative electrode current collector and the negative electrode active material, it is possible to use those commonly used in the art. As the negative electrode active material, it is possible to use, for example, carbon materials such as various natural graphites and artificial graphites, alloys, lithium metal, tin compounds, silicides and nitrides. In addition, as the binder and the conductive agent, it is possible to use the same binders and conductive agents as those used for the positive electrode.

As the negative electrode current collector, it is possible to use, for example, a metal foil comprising stainless steel, nickel or copper. The thickness of the negative electrode current collector is preferably, but not particularly limited to, 1 to 500 μm.

As the separator, it is possible to use those commonly used in the art. For example, it is possible to use a microporous polymer membrane comprising a polyolefin resin such as a polyethylene resin or a polypropylene resin.

The electrolyte includes a solvent and a solute dissolved in the solvent. As the solvent, it is possible to use, for example, ethylene carbonate, dimethyl carbonate, diethyl carbonate and ethylmethyl carbonate. These may be used alone or in combination of two or more of them. As the solute, it is possible to use, for example, various lithium compounds such as $LiPF_6$ and $LiBF_4$.

Embodiment 2

Figure 3:
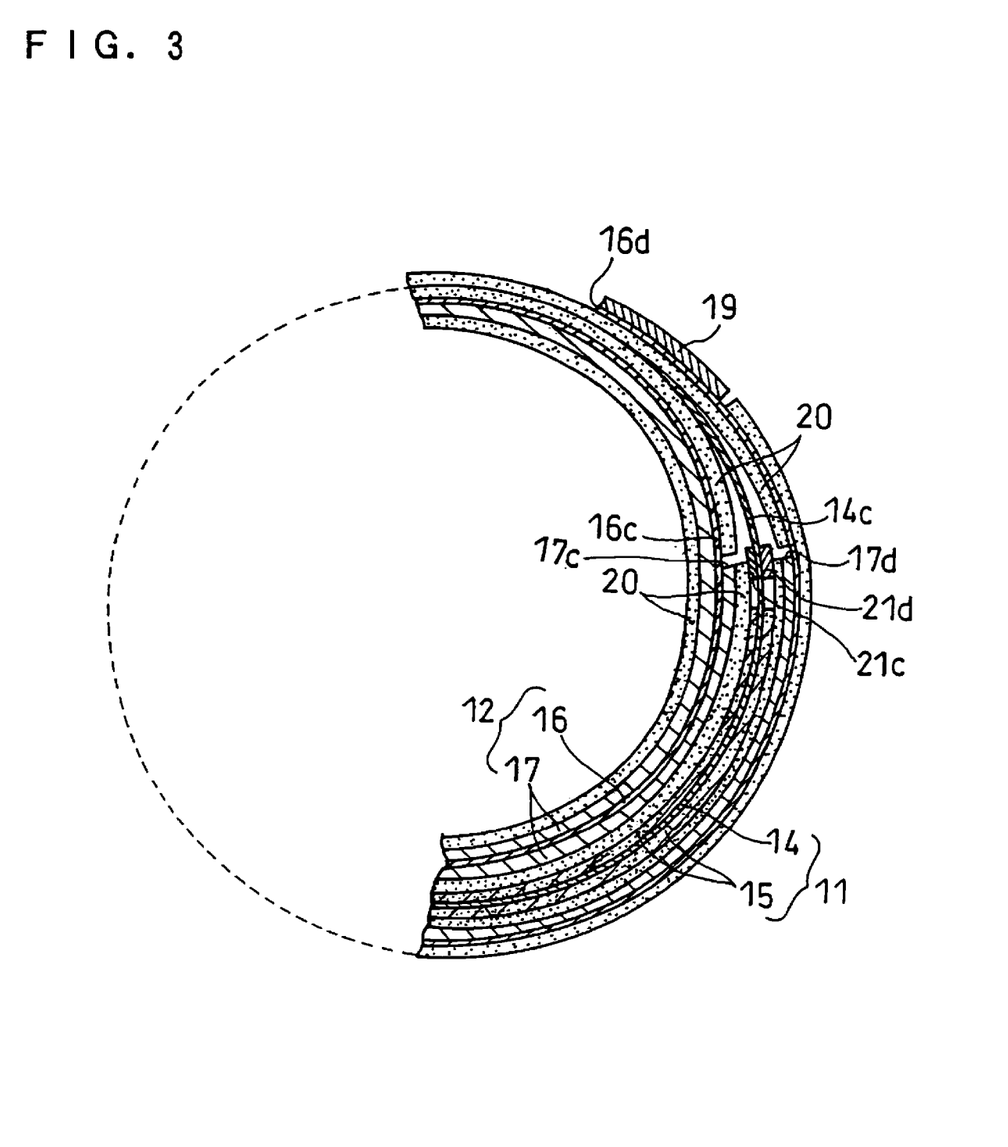
FIG. 3 is a cross-sectional view schematically showing an electrode group included in a lithium secondary battery according to another embodiment of the present invention on its outer circumferential side.

FIG. 3 shows an electrode group included in a lithium secondary battery according to another embodiment of the present invention on its outer circumferential side. In FIG. 3, the same reference numerals are given to the same components as those in FIGS. 1 and 2, and their description has been omitted.

In the electrode group shown in FIG. 3, the heat-resistant layer 20 is formed on each side of the negative electrode 12, instead of disposing a separator between the positive electrode 11 and the negative electrode 12. In addition, as shown in FIG. 3, when the paste for forming a heat-resistant layer is applied at a speed not lower than a predetermined speed, the heat-resistant layer will not be formed, for example, on parts of the negative electrode current collector that are respectively in the vicinity of the end 17c and the end 17d of the negative electrode active material layer. Further, as in Embodiment 1, the insulating tape 21c is attached onto a part of the exposed portion 14c of the positive electrode current collector that is opposite to the end 17c of the negative electrode active material layer 17, and the insulating tape 21d is attached onto a part of the exposed portion 14c of the positive electrode current collector that is opposite to the end 17d of the negative electrode active material layer.

Although not shown, the positive electrode and the negative electrode are also provided with an exposed portion on their current collectors on the central side of the electrode group shown in FIG. 3. At the negative electrode, the heat-resistant layer is formed on the exposed portion of the negative electrode current collector, except for its part located in the vicinity of the end of the negative electrode active material layer. On the positive electrode current collector located on the central side of the electrode group, the insulating tape is also attached onto a part of the exposed portion that is opposite to the end of the negative electrode active material layer.

Thus, even if no separator is used, it is possible to obtain a lithium secondary battery in which the safety has been improved, without decreasing the productivity, as with Embodiment 1 described above, by forming the heat-resistant layer on substantially the entire surface of the negative electrode, and attaching the insulating tape to a part of the exposed portion of the positive electrode current collector that is opposite to the end of the negative electrode active material layer.

Furthermore, since the heat-resistant layer also serves as the separator in this embodiment, it is not necessary to dispose a separator between the positive electrode and the negative electrode. Accordingly, it is possible to contain the positive electrode active material and the negative electrode active material in the electrode group in amounts greater than those contained in the conventional lithium secondary batteries. Consequently, it is possible to realize a lithium secondary battery having even higher capacity.

Further, as with Embodiment 1, it is preferable that the insulating tape is attached onto the exposed portion of the positive electrode current collector in a large area within a range that does not affect the productivity. It is more preferable that the insulating tape is attached only to the exposed portion of the positive electrode current collector.

It should be noted that also in this embodiment, the positive electrode may be provided with the exposed portion of the current collector at one of the initial winding end and the final winding end of the positive electrode. Similarly, the negative electrode may be provided with the exposed portion of the current collector at one of the initial winding end and the final winding end of the negative electrode. In this case, it is also possible to achieve the effect of the present invention by providing the insulating tape onto the positive electrode, and providing the heat-resistant layer on the negative electrode as described above.

Embodiment 3

The method for producing the lithium secondary battery of the present invention will be described below.

(Production Method 1)

The lithium secondary battery of the present invention can be produced, for example, by a method including the steps of:

(A) producing a positive electrode including a positive electrode current collector and at least one positive electrode active material layer carried on the positive electrode current collector and being provided with an exposed portion on the positive electrode current collector at at least one of an initial winding end and a final winding end of the positive electrode;

(B) producing a negative electrode including a negative electrode current collector and at least one negative electrode active material layer carried on the negative electrode current collector and being provided with an exposed portion on the negative electrode current collector at at least one of an initial winding end and a final winding end of the negative electrode;

(C) mixing a filler, a binder and a dispersion medium to prepare a paste for forming a heat-resistant layer by;

(D) applying the paste, at a predetermined speed, onto the negative electrode that is provided with the exposed portion of the negative electrode current collector at at least one of the initial winding end and the final winding end of the negative electrode, followed by drying, thereby forming a heat-resistant layer including the filler and the binder on the negative electrode;

(E) attaching an insulating tape onto a part of the exposed portion of the positive electrode current collector that will be opposite to the end of the negative electrode active material layer when the negative electrode and the positive electrode are wounded; and (F) winding the negative electrode including the Heat-resistant layer and the positive electrode including the insulating tape to obtain an electrode group.

In the above-described steps (A) and (B), the positive electrode and the negative electrode can be produced by a method commonly used in the art.

In the above-described step (C), the dispersion medium is preferably a dispersion medium in which the filler and the binder can be uniformly dispersed, and is preferably inert to the filler, the binder and the electrode plate components to which it is applied. Further, it is preferable that the dispersion medium evaporates at a temperature at which the properties of the filler, the binder and the negative electrode components will not be altered. As such a dispersion medium, it is preferable to use an organic solvent, and examples include N-methyl-2-pyrrolidone, methyl ethyl ketone and toluene. In addition, as the filler and the binder, those described above can be used.

As the apparatus for dispersing the filler and the binder in the dispersion medium, it is possible to use various dispersing apparatuses, including, for example, an internal mixer, a double arm mixer, a Henschel mixer and a paddle mixer.

In the above-described step (D), the paste for forming a heat-resistant layer can be applied onto the negative electrode by various application methods, including, for example, die coating, gravure coating and comma coating.

The speed of applying the paste is preferably 10 to 50 m/min. The reason is that, at this speed, it is possible to increase the productivity, while maintaining the coating accuracy.

Further, it is preferable to perform drying of the paste at a temperature at which the properties of the filler, the binder and the negative electrode components will not be altered, for example, at 80° C. to 140° C. It should be noted that since drying of the paste may also be performed under reduced pressure, since it is not necessary to increase the temperature to a high level.

In the above-described step (E), the insulating tape can be attached onto the exposed portion of the positive electrode current collector, for example, in the following manner. While unwinding the positive electrode that has been wound in the form of a roll, the boundary portion of the positive electrode active material layer and the exposed portion of the positive electrode current collector is detected with a sensor. Subsequently, the insulating tape is attached so as to cover at least a part of the exposed portion of the positive electrode current collector that will be opposite to the boundary portion between the end of the negative electrode active material layer and the exposed portion of the negative electrode current collector when the positive electrode and the negative electrode are wound. For example, the insulating tape can be attached onto the exposed portion of the positive electrode current collector, while sucking the side of the insulating tape on which no adhesive is applied, using a suction nozzle.

Then, each of the positive electrode onto which the insulating tape has been attached and the negative electrode on which the heat-resistant layer has been formed is cut into an appropriate length, and the positive electrode and the negative electrode are wound in such a manner that the heat-resistant layer is opposite to the positive electrode, and that the insulating tape is opposite to the end of the negative electrode active material layer. Thereby, an electrode group can be produced.

(Production Method 2)

In the case of an electrode group in which the positive electrode and the negative electrode are wound with the separator interposed between them, it is not necessary to form the heat-resistant layer on the entire surface of the negative electrode active material layer, and it is sufficient that the heat-resistant layer is formed on at least a part of the surface of the negative electrode active material layer that includes the end of the negative electrode active material layer. A lithium secondary battery including such an electrode group can be formed, for example, by a method including the steps of:

(a) producing a positive electrode including a positive electrode current collector and at least one positive electrode active material layer carried on the positive electrode current collector and being provided with an exposed portion on the positive electrode current collector at at least one of an initial winding end and a final winding end of the positive electrode;

(b) producing a negative electrode including a negative electrode current collector and at least one negative electrode active material layer carried on the negative electrode current collector and being provided with an exposed portion on the negative electrode current collector at at least one of an initial winding end and a final winding end of the negative electrode;

(c) mixing a filler, a binder and a dispersion medium to prepare a paste for forming a heat-resistant layer;

(d) applying the paste, at a predetermined speed, onto at least a part of the exposed portion of the negative electrode current collector, and at least a part of the surface of the negative electrode active material layer that includes the end of the negative electrode active material layer, followed by drying, thereby forming a heat-resistant layer including the filler and the binder on the negative electrode;

(e) attaching an insulating tape onto a part of the exposed portion of the positive electrode current collector that will be opposite to the end of the negative electrode active material layer when the negative electrode and the positive electrode are wounded; and (f) winding the positive electrode including the insulating tape attached thereon and the negative electrode including the heat-resistant layer formed thereon, with a separator disposed between the positive electrode and the negative electrode, to obtain an electrode group.

It should be noted that in the above-described step (d), the heat-resistant layer may be formed on the entire surface of the negative electrode active material layer, in order to further prevent short circuit, and to improve the heat resistance of the negative electrode.

Production Method 2 of this embodiment is different from Production Method 1 described above in that it is sufficient the heat-resistant layer is formed on at least a part of the surface of the negative electrode active material layer that includes the end of the negative electrode active material layer, and that the positive electrode and the negative electrode are wound with the separator interposed between them (the step (d) and the step (f)). The steps other than the step (d) and the step (f) are the same as those in Production Method 1. As the paste for forming a heat-resistant layer and the insulating tape, it is possible to use those used in Production Method 1. Further, the speed of applying the paste is the same as that in Production Method 1.

As described above, with Production Methods 1 and 2, it is possible to efficiently produce a lithium secondary battery with high level of safety, regardless of whether the separator is disposed between the positive electrode and the negative electrode.

In the following, the present invention will be described by way of examples.

EXAMPLES

Example 1

(Battery 1)

Figure 4:
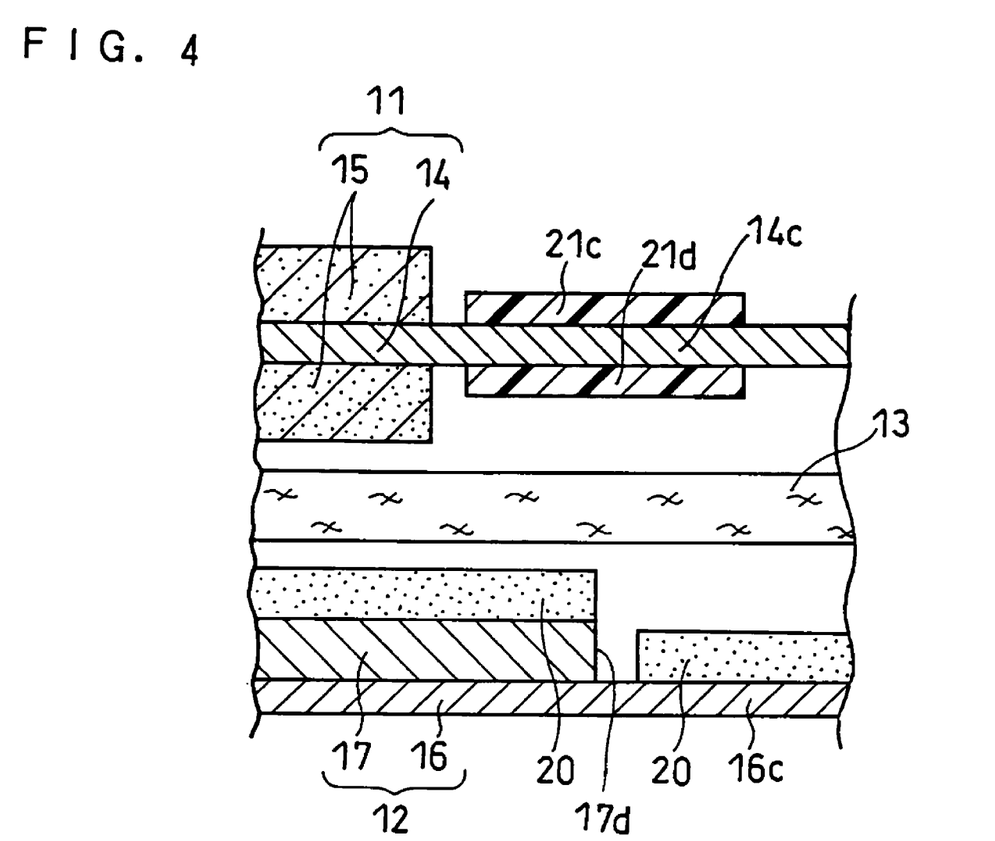
FIG. 4 is a cross-sectional view schematically showing the final winding end of the positive electrode active material layer and the final winding end of the negative electrode active material layer in an electrode group produced in Example 1.

A lithium secondary battery including an electrode group as shown in FIG. 4 was fabricated. FIG. 4 shows the placement of the components on the final winding end of the positive electrode and the negative electrode that are included in the produced electrode group. It should be noted that the electrode group shown in FIG. 4 is different from the electrode group shown in FIG. 1 and FIG. 2 in that the heat-resistant layer is formed on the entire surface of the negative electrode active material layer included in the electrode group.

(Production of Positive Electrode)

A paste for positive electrode active material layer was prepared by mixing, with a double arm kneader, 3 kg of lithium cobaltate, 1 kg of an N-methyl-2-pyrrolidone (hereinafter abbreviated NMP) solution of polyvinylide fluoride (#1320 (solid content: 12%) manufactured by KUREHA CORPORATION)), 90 g of acetylene black and a suitable amount of NMP. This paste was discontinuously applied onto both sides of a 15 μm thick positive electrode current collector made of aluminum, and the whole was dried, and rolled to have a total thickness of 160 μm, obtaining a positive electrode plate. Thereafter, the obtained positive electrode plate was cut to have a width that could be inserted into a 18650 type cylindrical battery case can, thereby obtaining a positive electrode.

(Attachment of Insulating Tape)

Then, the insulating tape is attached onto the exposed portion of the positive electrode current collector. For example, on the final winding side of the positive electrode, the insulating tape 21c is attached onto a part of the exposed portion 14c of the positive electrode current collector that is opposite to the end 17c (not shown) of the negative electrode active material layer, and the insulating tape 21d is attached onto a part of the exposed portion 14c of the positive electrode current collector that is opposite to the end 17d of the negative electrode active material layer, as shown in FIG. 4. On the initial winding side of the positive electrode, the insulating tape is attached onto the exposed portion of the positive electrode current collector in the same manner.

As the insulating tape, an insulating tape obtained by applying an acrylic rubber adhesive onto a polypropylene film having a thickness of 30 μm was used.

(Production of Negative Electrode)

A paste for negative electrode active material layer was prepared by mixing, with a double arm kneader, 3 kg of artificial graphite, 75 g of a binder comprising styrene-butadiene copolymer rubber particles (BM-400B (solid content: 40%) manufactured by ZEON Corporation)), 30 g of carboxymethyl cellulose (CMC) and a suitable amount of water. This paste was discontinuously applied onto both sides of a 10 μm thick negative electrode current collector made of copper, dried, and rolled to have a total thickness of 180 μm, obtaining a negative electrode plate. Thereafter, the obtained negative electrode plate was cut to have a width that could be inserted into a 18650 type cylindrical battery case can, thereby obtaining a negative electrode.

(Production of Heat-Resistant Layer)

A paste for forming a heat-resistant layer was prepared by mixing, with a double arm kneader, 970 g of alumina having a median diameter of 0.3 μm, 375 g of a binder comprising modified polyacrylonitrile rubber (BM-720H (solid content: 8%) manufactured by ZEON Corporation)) and a suitable amount of NMP. This paste was applied onto the negative electrode in a thickness of 6 μm by gravure coating, and dried for 10 hours at 120° C. under reduced pressure, forming a heat-resistant layer. The speed of applying the paste was 20 m/min. At this time, the heat-resistant layer was not formed on a part of the exposed portion of the negative electrode current collector that was in the vicinity of the negative electrode active material layer, as shown in FIG. 4. The porosity of the heat-resistant layer was 50%.

(Assembly of Battery)

The thus obtained positive electrode and negative electrode were wound with a polyethylene separator having a thickness of 10 μm interposed between them, and the electrodes were cut at a predetermined position on a final winding side, thereby producing an electrode group.

Then, the obtained electrode group was inserted into the battery case can, and 5.5 g of an electrolyte was added into the battery case can. Thereafter, the opening of the battery case can was sealed with a sealing plate, thus producing a 18650 type cylindrical lithium secondary battery. The obtained battery was named Battery 1. The electrolyte used here was an electrolyte obtained by dissolving $LiPF_6$ at a concentration of 1 mol/L in a mixed solvent comprising ethylene carbonate, dimethyl carbonate and ethylmethyl carbonate at a volume ratio of 2:2:4, and further dissolving vinylene carbonate at a concentration of 3 vol %.

Example 2

(Battery 2)

A lithium secondary battery including an electrode group as shown in FIG. 3 was fabricated.

The heat-resistant layer 20 was formed on the negative electrode in the same manner as with Battery 1. At this time, the heat-resistant layer was not formed on a part of the exposed portion of the negative electrode current collector that was in the vicinity of the end of the negative electrode active material layer. Further, the insulating tape was attached onto a part of each of the exposed portions of the positive electrode current collector that was opposite to the corresponding end of the negative electrode active material layer, in the same manner as with Battery 1. The thus obtained positive electrode and negative electrode were wound without using a separator, obtaining an electrode group having the same diameter as that of the electrode group contained in Battery 1. Battery 2 was fabricated by the same production method as used for Battery 1, except that the obtained electrode group was used.

Comparative Example 1

(Comparative Battery 1)

Figure 5:
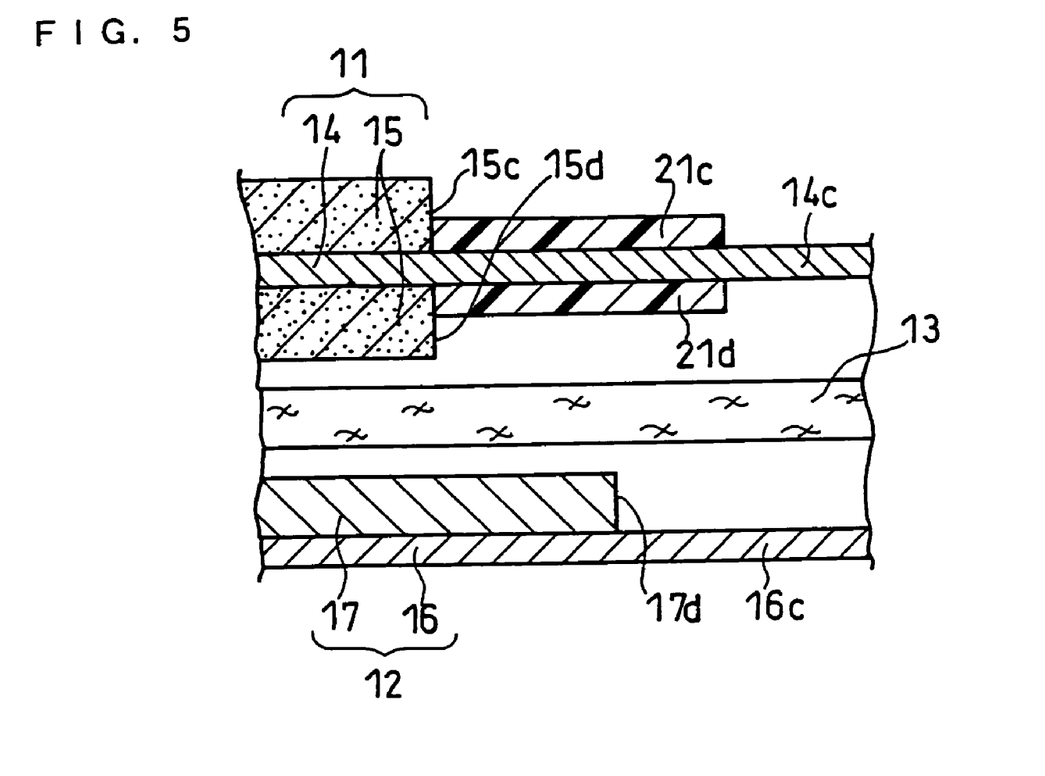
FIG. 5 is a cross-sectional view schematically showing the placement of the components in the vicinity of the final winding end of the positive electrode active material layer, and the final winding end of the negative electrode active material layer in an electrode group produced in Comparative Example 1.

FIG. 5 shows the placement of the components on the final winding side of the positive electrode and the negative electrode that are included in the electrode group used for Comparative Battery 1. The placement of the components on the initial winding side of the positive electrode and the negative electrode is basically the same as the placement shown in FIG. 5. Additionally, the placement of the components on the final winding side of the positive electrode and the negative electrode is also schematically shown in FIGS. 6 to 8, which respectively show the electrode groups used for the following Comparative Batteries 2 to 4.

As shown in FIG. 5, on the final winding side of the positive electrode, the insulating tapes 21c and 21d were respectively attached onto parts of the exposed portion 14c of the positive electrode current collector that were respectively opposite to the ends 17c (not shown) and 17d of the negative electrode active material layer 17. Here, the insulating tapes 21c and 21d were attached onto the positive electrode such that their ends were respectively in contact with ends 15c and 15d of the positive electrode active material layer 15. Similarly, on the initial winding side of the positive electrode, the insulating tapes were attached onto the exposed portion of the positive electrode current collector in the same manner as described above.

The heat-resistant layer was not formed on the negative electrode. In addition, the thickness of the separator 13 was changed to 16 μm.

Except for the foregoing, Comparative Battery 1 was fabricated by the same production method as used for Battery 1.

Comparative Example 2

(Comparative Battery 2)

Figure 6:
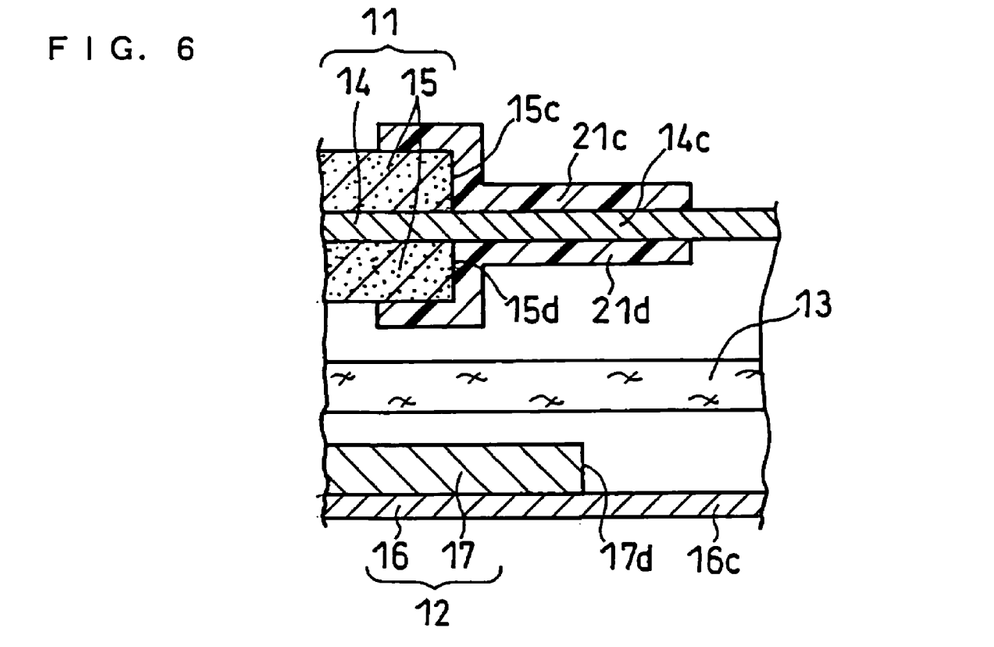
FIG. 6 is a cross-sectional view schematically showing the placement of the components in the vicinity of the final winding end of the positive electrode active material layer, and the final winding end of the negative electrode active material layer in an electrode group produced in Comparative Example 2.

As shown in FIG. 6, on the final winding side of the positive electrode, the insulating tape 21c was attached so as to cover a part of the exposed portion 14c of the positive electrode current collector that was opposite to the end 17c (not shown) of the negative electrode active material layer 17 and a part of the surface of the positive electrode active material layer that includes the end 15c. Similarly, the insulating tape 21d was attached so as to cover a part of the exposed portion 14c of the positive electrode current collector that was opposite to the end 17d of the negative electrode active material layer and a part of the surface of the positive electrode active material layer that included the end 15d. Also on the initial winding side of the positive electrode, the insulating tape was attached onto the positive electrode in the same manner as described above.

The heat-resistant layer was not formed on the negative electrode. In addition, the thickness of the separator 13 was changed to 16 μm.

Except for the foregoing, Comparative Battery 2 was fabricated by the same production method as used for Battery 1.

Comparative Example 3

(Comparative Battery 3)

Figure 7:
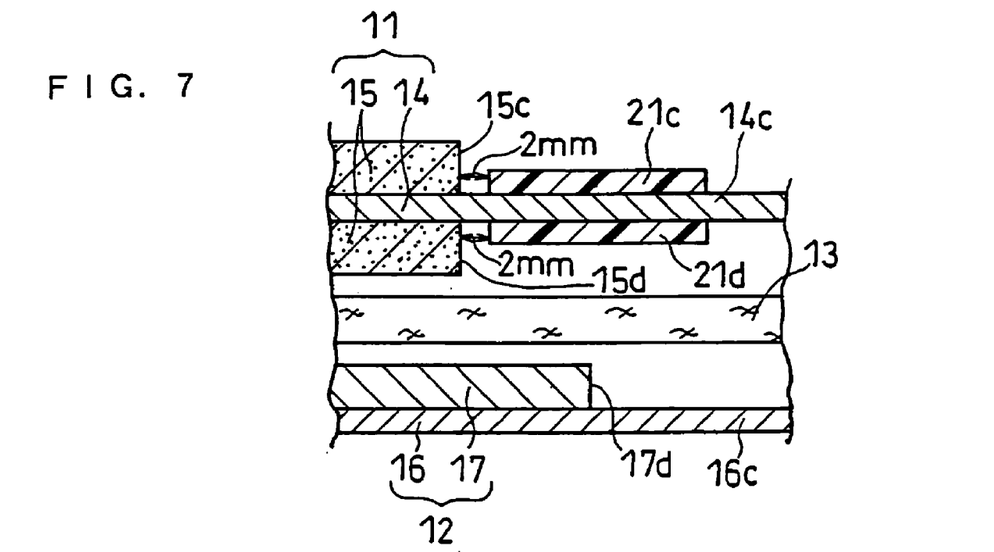
FIG. 7 is a cross-sectional view schematically showing the placement of the components in the vicinity of the final winding end of the positive electrode active material layer, and the final winding end of the negative electrode active material layer in an electrode group produced in Comparative Example 3.

As shown in FIG. 7, on the final winding side of the positive electrode, the insulating tape 21c was attached onto the side of the exposed portion 14c of the positive electrode current collector that faced the inner circumferential side of the electrode group, on an area extending from a position 2 mm away from the end 15c of the positive electrode active material layer to a predetermined position. Similarly, the insulating tape 21d was attached onto the side of the exposed portion 14c of the positive electrode current collector that faced the outer circumferential side of the electrode group, on an area extending from a position 2 mm away from the end 15d of the positive electrode active material layer to a predetermined position. Also on the initial winding side of the positive electrode, the insulating tapes were attached onto the exposed portion of the positive electrode current collector in the same manner as described above.

The heat-resistant layer was not formed on the negative electrode. In addition, the thickness of the separator 13 was changed to 16 μm.

Except for the foregoing, Comparative Battery 3 was fabricated by the same production method as used for Battery 1. Additionally, in the electrode group included in Comparative Battery 3, the parts of the exposed portions of the positive electrode current collector onto which the insulating tape were attached included the parts opposite to the ends of the negative electrode active material layer.

Comparative Example 4

(Comparative Battery 4)

Figure 8:
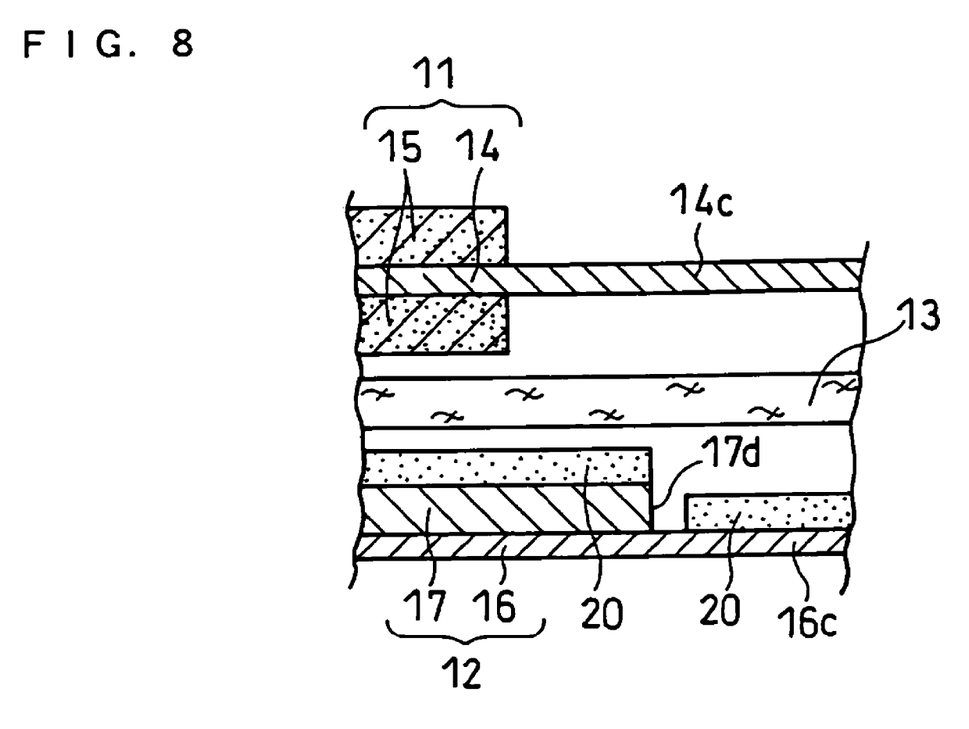
FIG. 8 is a cross-sectional view schematically showing the placement of the components in the vicinity of the final winding end of the positive electrode active material layer, and the final winding end of the negative electrode active material layer in an electrode group produced in Comparative Example 4.

The heat-resistant layer was formed on the negative electrode in the same manner as with Battery 1. At this time, on the final winding side of the negative electrode, the heat-resistant layer 20 was not formed on a part of the exposed portion 16c of the negative electrode current collector that was in the vicinity of the end 17c (not shown) of the negative electrode active material layer, and a part of the exposed portion 16c that was in the vicinity of the end 17d of the negative electrode active material layer, as shown in FIG. 8. This was the same for the initial winding side of the negative electrode.

The insulating tape was not attached onto the exposed portion of the positive electrode current collector.

Except for the foregoing, Comparative Battery 4 was fabricated by the same production method as used for Battery 1.

It should be noted that the electrode groups of Batteries 1 and 2, and Comparative Batteries 1 to 4 had the same cross-sectional diameter.

[Evaluation]

The thus fabricated Batteries 1 and 2, and comparative Batteries 1 to 4 were evaluated in the following manner.

(Cycle Test)

1000 pieces each of Batteries 1 and 2 and Comparative Batteries 1 to 4 were subjected to a cycle test in which 500 cycles of charge/discharge were performed at 20° C. under the following conditions. The frequency with which the batteries suffered insulation failure during 500 cycles was evaluated. The results are shown in Table 1.

(1) Constant current charge: 1400 mA (end voltage: 4.2 V)
(2) Constant voltage charge: 4.2 V (end current: 100 mA)
(3) Constant current discharge: 2000 mA (end voltage: 3 V)

(Charge/Discharge Test)

Batteries 1 and 2 and Comparative Batteries 1 to 4 were subjected to a charge/discharge test at 20° C. under the following conditions,-and their discharge capacities were determined. The results are shown in Table 1.

(1) Constant current charge: 1400 mA (end voltage: 4.2 V)
(2) Constant voltage charge: 4.2 V (end current: 100 mA)
(3) Constant current discharge: 2000 mA (end voltage: 3 V)

(Productivity)

For each of Batteries 1 and 2 and Comparative Batteries 1 to 4, it was determined how many batteries could be fabricated within one hour by attaching the insulating tape onto the exposed portion of the positive electrode current collector after producing the positive electrode and the negative electrode including the heat-resistant layer. The results are shown in Table 1.

TABLE 1

|  | Battery capacity (mAh) | Number of insulation failure during cycles (pcs.) | Volume of production per hour (pcs.) |
| --- | --- | --- | --- |
| Example 1 | 2200 | 0/1000 | 600 |
| Example 2 | 2350 | 0/1000 | 600 |
| Com. Example 1 | 2200 | 0/1000 | 210 |
| Com. Example 2 | 2150 | 0/1000 | 600 |
| Com. Example 3 | 2200 | 3/1000 | 600 |
| Com. Example 4 | 2200 | 4/1000 | 710 |

In the cycle test, some pieces of Comparative Batteries 3 and 4 suffered insulation failure. These pieces of batteries were disassembled, and the insides of the batteries were observed. As a result, in the case of Comparative Battery 3, it was found that internal short circuit had occurred between the negative electrode and a part of the exposed portion of the positive electrode current collector that was located between the end of the positive electrode active material layer and the end of the insulating tape, since the insulating tape was attached onto the exposed portion of the positive electrode current collector from a position away from the end of the positive electrode active material layer. In the case of Comparative Battery 4, it was found that internal short circuit had occurred between the positive electrode and the boundary portion, on which the heat-resistant layer was not formed, of the end of the negative electrode active material layer and the exposed portion of the negative electrode current collector. On the other hand, in the case of Batteries 1 and 2 and Comparative Batteries 1 and 2, no insulation failure was observed.

Comparative Battery 2 showed a particularly significant decrease in the discharge capacity. The reason seems to be that the amount of the positive electrode active material that could contribute to the battery reaction was decreased in Comparative Battery 2, since the insulating tape was attached so as to cover a part of the positive electrode active material layer.

In the case of Battery 2, the heat-resistant layer also served as the separator, so that it was not necessary to provide a separator as a separate element. Since it was not necessary to use a separator as a separate element, the space between the positive electrode and the negative electrode in Battery 2 could be made smaller than that of the batteries in which the separator was disposed between the positive electrode and the negative electrode. This seems to have made it possible to increase the amounts of the active materials contained in the unit volume of the electrode group, as compared with other batteries using the separator, thus increasing the discharge capacity.

The productivity was significantly reduced for Comparative Battery 1. In the case of Comparative Battery 1, the insulating tape was attached onto the entire surface of the exposed portion of the positive electrode current collector, without covering the positive electrode active material layer. It requires an extremely high precision and therefore time to attach the insulating tape in this manner. This seemed to have decreased the productivity. In addition, the rest of the batteries exhibited high productivity of not less than 600 pieces.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A lithium secondary battery comprising an electrode group obtained by winding a positive electrode and a negative electrode,
    said positive electrode including a positive electrode current collector and a positive electrode active material layer carried on said positive electrode current collector,
    said negative electrode including a negative electrode current collector and a negative electrode active material layer carried on said negative electrode current collector,
    an exposed portion on which said positive electrode active material layer is not carried being provided on said positive electrode current collector at at least one of an initial winding end and a final winding end of said positive electrode,
    an exposed portion on which said negative electrode active material layer is not carried being provided on said negative electrode current collector at at least one of an initial winding end and a final winding end of said negative electrode,
    wherein a heat-resistant layer including a filler and a binder is formed on said exposed portion of said negative electrode current collector excluding a boundary portion between an end of said negative electrode active material layer and said exposed portion of said negative electrode current collector, and the entire surface of said negative electrode active material layer on said negative electrode,
    at least one of an initial winding end and a final winding end of said negative electrode active material layer, each of which is provided with said heat-resistant layer, is opposite to said exposed portion of said positive electrode current collector, and
    said positive electrode comprises an insulating tape attached onto at least a part of said exposed portion of said positive electrode current collector that is opposite to said end of said negative electrode active material layer provided with said heat-resistant layer, said insulating tape including a substrate and an adhesive applied onto said substrate.

2. The lithium secondary battery in accordance with claim 1, wherein said insulating tape is attached onto only said exposed portion of said positive electrode current collector.

3. A lithium secondary battery comprising an electrode group obtained by winding a positive electrode, a negative electrode and a separator disposed between said positive electrode and said negative electrode,
    said positive electrode including a positive electrode current collector and a positive electrode active material layer carried on said positive electrode current collector,
    said negative electrode including a negative electrode current collector and a negative electrode active material layer carried on said negative electrode current collector,
    an exposed portion on which said positive electrode active material layer is not carried being provided on said positive electrode current collector at at least one of an initial winding end and a final winding end of said positive electrode, an exposed portion on which said negative electrode active material layer is not carried being provided on said negative electrode current collector at at least one of an initial winding end and a final winding end of said negative electrode, wherein a heat-resistant layer including a filler and a binder is formed on said exposed portion of said negative electrode current collector excluding a boundary portion between an end of said negative electrode active material layer and said exposed portion of said negative electrode current collector, and at least a part of a surface of said negative electrode active material layer that includes at least one of an initial winding end and a final winding end of said negative electrode active material layer, said end of said negative electrode active material layer provided with said heat-resistant layer is opposite to said exposed portion of said positive electrode current collector, and said positive electrode comprises an insulating tape attached onto at least a part of said exposed portion of said positive electrode current collector that is opposite to said end of said negative electrode active material layer provided with said heat-resistant layer, said insulating tape including a substrate and an adhesive applied onto said substrate.

4. The lithium secondary battery in accordance with claim 3, wherein said insulating tape is attached onto only said exposed portion of said positive electrode current collector.

5. A method for producing a lithium secondary battery comprising an electrode group in which a positive electrode including a positive electrode current collector and a positive electrode active material layer carried on said positive electrode current collector, and a negative electrode including a negative electrode current collector and a negative electrode active material layer carried on said negative electrode current collector are wound, said method comprising the steps of:

(A) producing a positive electrode in which an exposed portion is provided on said positive electrode current collector at at least one of an initial winding end and a final winding end of said positive electrode;

(B) producing a negative electrode in which an exposed portion is provided on said negative electrode current collector at at least one of an initial winding end and a final winding end of said negative electrode;

(C) mixing a filler, a binder and a dispersion medium to prepare a paste for forming a heat-resistant layer;

(D) applying said paste on said exposed portion of said negative electrode current collector excluding a boundary portion between an end of said negative electrode active material layer and said exposed portion of said negative electrode current collector, and the entire surface of said negative electrode active material layer, followed by drying, thereby forming a heat-resistant layer;

(E) attaching an insulating tape including a substrate and an adhesive applied onto said substrate, onto a part of said exposed portion of said positive electrode current collector that is opposite to an end of said negative electrode active material layer provided with said heat-resistant layer; and (F) winding said positive electrode including said insulating tape attached thereon, and said negative electrode including said heat-resistant layer formed thereon to obtain an electrode group.

6. A method for producing a lithium secondary battery comprising an electrode group in which a positive electrode including a positive electrode current collector and a positive electrode active material layer carried on said positive electrode current collector, a negative electrode including a negative electrode current collector and a negative electrode active material layer carried on said negative electrode current collector, and a separator disposed between said positive electrode and said negative electrode are wound, said method comprising the steps of:

(a) producing a positive electrode in which an exposed portion is provided on said positive electrode current collector at at least one of an initial winding end and a final winding end of said positive electrode;

(b) producing a negative electrode in which an exposed portion is provided on said negative electrode current collector at at least one of an initial winding end and a final winding end of said negative electrode;

(c) mixing a filler, a binder and a dispersion medium to prepare a paste for forming a heat-resistant layer;

(d) applying said paste on said exposed portion of said negative electrode current collector excluding a boundary portion between an end of said negative electrode active material layer and said exposed portion of said negative electrode current collector, and at least a part of a surface of said negative electrode active material layer that includes at least one of an initial winding end and a final winding end of said negative electrode active material layer, followed by drying, thereby forming a heat-resistant layer;

(e) attaching an insulating tape including a substrate and an adhesive applied onto said substrate, onto a part of said exposed portion of said positive electrode current collector that is opposite to said end of said negative electrode active material layer provided with said heat-resistant layer; and (f) winding said positive electrode including said insulating tape attached thereon, and said negative electrode including said heat-resistant layer formed thereon, with a separator interposed between said positive electrode and said negative electrode to obtain an electrode group.

7. The method for producing a lithium secondary battery according to claim 6, wherein said heat resistant layer is formed on the entire surface of said negative electrode active material layer in said step (d).

8. The lithium secondary battery according to claim 1, wherein said substrate includes at least one selected from the group consisting of polypropylene, polyphenylene sulfide, and an imide resin, and said adhesive includes at least one of an acrylic rubber and a butyl rubber.

9. The lithium secondary battery according to claim 3, wherein said substrate includes at least one selected from the group consisting of polypropylene, polyphenylene sulfide, and an imide resin, and said adhesive includes at least one of an acrylic rubber and a butyl rubber.

10. The method for producing a lithium secondary battery according to claim 5, wherein said substrate includes at least one selected from the group consisting of polypropylene, polyphenylene sulfide, and an imide resin, and said adhesive includes at least one of an acrylic rubber and a butyl rubber.

11. The method for producing a lithium secondary battery according to claim 6,
wherein said substrate includes at least one selected from the group consisting of polypropylene, polyphenylene sulfide, and an imide resin, and said adhesive includes at least one of an acrylic rubber and a butyl rubber.

* * * * *